United States Patent

[11] 3,617,210

| [72] | Inventors | Johannes Dehnert<br>Ludwigshafen;<br>Gerhard Grau, Limburgerhof, both of<br>Germany |
|---|---|---|
| [21] | Appl. No. | 864,187 |
| [22] | Filed | Oct. 6, 1969 |
| [45] | Patented | Nov. 2, 1971 |
| [73] | Assignee | Badische Anilin - & Soda-Fabrik<br>Aktiengesellschaft<br>Ludwigshafen/Rhine, Germany |
| [32] | Priority | Oct. 12, 1968 |
| [33] | | Germany |
| [31] | | P 18 02 863.2 |

[54] PROCESS FOR DYEING POLYAMIDES WITH DYES CONTAINING SULFONIC ACID GROUPS
2 Claims, No Drawings

[52] U.S. Cl. .................................................. 8/178, 260/309.2, 260/294.3 C, 260/247.2 B
[51] Int. Cl. ........................................................ D06p 3/24
[50] Field of Search ............................................ 8/178, 1 W; 260/304, 309.2

[56] References Cited
UNITED STATES PATENTS

| 3,014,041 | 12/1961 | Hausermann et al. ........ | 260/304 |
|---|---|---|---|
| 3,501,490 | 3/1970 | Maeder et al. ................ | 260/309.2 X |

*Primary Examiner*—George F. Lesmes
*Assistant Examiner*—T. J. Herbert, Jr.
*Attorney*—Johnston, Root, O'Keeffe, Keil, Thompson & Shurtleff

ABSTRACT: A process for dyeing polyamide textile material with acid dyes of the 3-imidazolyl-7-aminocoumarin series.

PROCESS FOR DYEING POLYAMIDES WITH DYES CONTAINING SULFONIC ACID GROUPS

The invention relates to a process for dyeing polyamide textile material with dyes having the general formula (I):

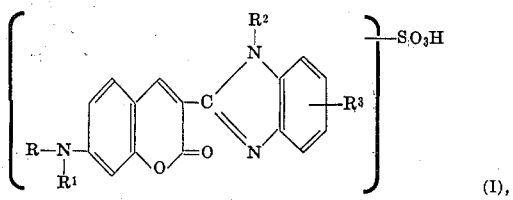

(I), where

R denotes a hydrogen atom, an alkyl group having one to four carbon atoms and which may be substituted by alkoxy, chloro, bromo, carboxyl, carbalkoxy, amido or acetoxy, a cyclohexyl group, a benzyl group or a phenylethyl group, $R^1$ denotes a hydrogen atom, or an alkyl group having from one to four carbon atoms and which may be substituted by alkoxy, chloro, bromo, carboxyl, carbalkoxy, amido or acetoxy, R and $R^1$ together with the nitrogen atom denote the radical of a five-membered or six-membered heterocyclic ring, $R^2$ denotes a hydrogen atom, a methyl group or an ethyl group, and $R^3$ denotes a hydrogen, chlorine or bromine atom or a methyl, ethyl, methoxy or ethoxy group.

The following are examples of R and $R^1$ (in addition to those already individually specified):

methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl, β-acetoxypropyl.

The radicals R and $R^1$ together with the nitrogen atom denote, for example, the radical of pyrrolidine, piperidine or morpholine.

Dyes which are particularly suitable industrially have the general formula:

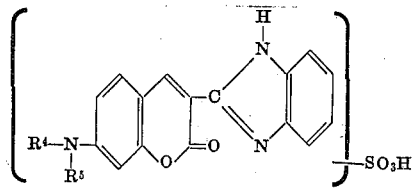

in which $R^4$ and $R^5$ are alkyl radicals having one to four carbon atoms. Preferred radicals are methyl and ethyl radicals.

The dyes having the said formulas may be used as such or in the form of their salts, for example alkali metal salts or ammonium salts. They dye by conventional methods textile material of natural and particularly synthetic polyamides such as nylon 6 or nylon 6,6 or compounds having a similar constitution. They give greenish yellow fluorescent dyeings having good fastness properties.

The new dyes may be prepared by sulfonating dyes devoid of sulfonic acid groups but otherwise having the formula (I).

Oleum, which contains from 10 to 50 % $SO_3$, is for example suitable as sulfonating agent. Sulfonation is advantageously carried out at a temperature of from 10° to 50° C.

Compounds having the general formula (II):

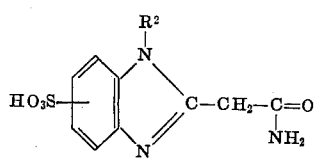

(II)

may also be condensed with hydroxybenzaldehydes having the general formula (III):

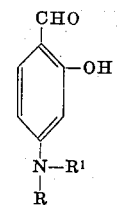

(III)

where R to $R^3$ have the meanings given above.

Compounds having the formula II are obtained by sulfonation of cyanomethyl-benzimidazoles, for example with oleum containing up to 50 percent sulfur trioxide, at temperatures of from 0° to 50° C.

The condensation of the compounds having the formula II with those having the formula III is preferably carried out at elevated temperature, for example at from 60° to 150° C. in solvents such as methane, ethanol, butanols, glycol, glycol monomethyl ether or dimethylformamide.

The following example illustrates the invention. Unless otherwise stated, references to parts and percentages in the following examples are by weight.

EXAMPLE

Production of the dye by sulfonation:

333 parts of 3-(benzimidazolyl-2')-7-diethylaminocoumarin is introduced at room temperature into 1,000 parts of 10 percent oleum. The mixture is stirred for 3 hours at 50° C., cooled while stirring and poured into 2,000 parts of ice water while stirring. The precipitated sulfonation product is suction filtered and washed with 500 parts of water.

The moist filter cake is suspended in 4,000 parts of water, then adjusted to a pH of 8 with 10 percent caustic soda solution: the dye dissolves completely. The sodium salt of the dye is precipitated by adding 10,000 parts by volume of saturated sodium chloride solution, suction filtered, washed with 2,000 parts by volume of 10 percent sodium chloride solution and dried at 70° C. An orange powder is obtained which gives in water a bright yellow solution having a greenish fluorescence.

Sulfonation may also be carried out by stirring for 12 hours at room temperature and otherwise adopting the same procedure.

By sulfonating the compounds 3-(5'-chlorobenzimidazolyl-2')-7-diethylaminocoumarin,
3-(5'-chlorobenzimidazolyl-2')-7-dimethylaminocoumarin, or
3-(5'-methylbenzimidazolyl-2')-7-diethylaminocoumarin instead of the said dye, acid dyes having very similar properties are obtained.

a. Production of the dye by sulfonation and condensation:

320 parts of 2-cyanomethylbenzimidazole is introduced while cooling with ice into 1,800 parts of oleum containing 10 percent of free $SO_3$. The reaction mixture is stirred for 4 hours at room temperature and then poured onto 2,000 parts of ice. The deposited precipitate is suction filtered, washed with 500 parts of water and dried at 70°C.

402 parts of a colorless powder is obtained.

b. (3-benzimidazolyl-2')-7-diethylaminocoumarin sulfonic acid (sodium salt):

98 parts of 4-diethylamino-4-hydroxybenzaldehyde,
128 parts of a compound benzimidazolyl-2-acetamide sulfonic acid prepared as described above and
46 parts of pyrrolidine are dissolved in
300 parts of methanol and the whole boiled under reflux for 4 hours.

The reaction mixture is brought to pH 4 with dilute hydrochloric acid, the deposited orange-red precipitate is suction filtered, washed with water and suspended again in 500 parts of water. By adding dilute caustic soda solution, the dye is brought into solution at 60° C. and precipitated again by adding
500 parts of common salt solution. After suction filtration, washing and drying, an orange powder is obtained which dissolves in water.

USE FOR DYEING 10 parts of a woven or knitted fabric of synthetic polyamide (nylon 6, nylon 6,6 or nylon 11) is introduced into a liquor which contains 0.01 part of the dye prepared according to (a), 0.3 part of 30 percent acetic acid, and 0.2 part of a commercial levelling agent in 400 parts of water.

The temperature of the dye liquor is raised from 40° to 100° C. within 30 minutes and kept at this temperature for 60 minutes. The dyed material is then rinsed and dried. The dyeing obtained is greenish yellow, of high brilliance, has good fastness to light and very good all-round fastnesses.

Flocks, filaments, threads or yarn of synthetic polyamides may also be dyed. The acetic acid may also be replaced by 2 percent (with reference to the weight of the textile material) of 85° percent formic acid.

We claim:
1. A process for dyeing synthetic polyamide textile materials, which comprises dyeing said textile materials in an aqueous dye bath with a dye of the formula:

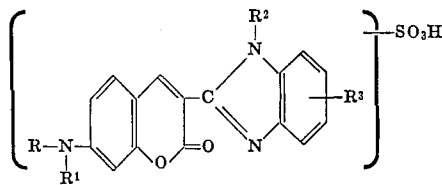

wherein R denotes a hydrogen atom or a methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl, or β-acetoxypropyl group, $R^1$ denotes a hydrogen atom or a methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl, or β-acetoxypropyl group, R and $R^1$ together with the nitrogen atom denote the radical of pyrrolidine, piperidine or morpholine, $R^2$ denotes a hydrogen atom or a methyl or ethyl group; and $R^3$ denotes a hydrogen, chlorine or bromine atom or a methyl, ethyl, methoxy or ethoxy group.

2. A process according to claim 1, wherein the dye has the formula:

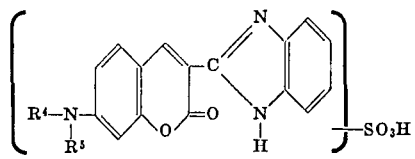

wherein $R^4$ and $R^5$ denote alkyl radicals having one to four carbon atoms.